US 6,515,390 B1

(12) United States Patent
Lopatinsky et al.

(10) Patent No.: US 6,515,390 B1
(45) Date of Patent: Feb. 4, 2003

(54) ELECTRIC DRIVE APPARATUS WITH A ROTOR HAVING TWO MAGNETIZIED DISKS

(75) Inventors: Edward L. Lopatinsky, La Jolla, CA (US); Saveliy T. Rosenfeld, San Diego, CA (US); Khivrich Sergey Florianovich, Leningradskaya (RU); Churikov Pavel Mikhaylovich, Sankt-Peterburg (RU); Fedosov Juriy Igorevich, Sankt-Peterburg (RU); Evseev Rudolf Kirillovich, Sankt-Peterburg (RU)

(73) Assignee: Advanced Rotary Systems LLC, San Diego, CA (US)

( * ) Notice: Subject to any disclaimer, the term of this patent is extended or adjusted under 35 U.S.C. 154(b) by 0 days.

(21) Appl. No.: 09/621,104

(22) Filed: Jul. 21, 2000

(30) Foreign Application Priority Data

Jul. 23, 1999 (RU) ............................................ 99117913
Dec. 9, 1999 (RU) ............................................ 99127325

(51) Int. Cl.⁷ ........................ H02K 21/12; H02K 31/00; H02K 1/22
(52) U.S. Cl. .................. 310/178; 370/268; 370/156.37; 310/156.64
(58) Field of Search ............................ 310/156, 156.01, 310/268, 269, 261, 254, 156.64, 156.32, 156.33, 156.34, 156.35, 156.36, 156.37, 178, 156.65

(56) References Cited

U.S. PATENT DOCUMENTS

| | | | |
|---|---|---|---|
| 3,553,510 A | | 1/1971 | Howey |
| 3,646,376 A | | 2/1972 | Anderson |
| 3,906,267 A | * | 9/1975 | Coupin et al. ............... 310/126 |
| 3,979,619 A | * | 9/1976 | Whiteley ............... 310/154.06 |
| 4,127,802 A | * | 11/1978 | Johnson ....................... 310/114 |
| 4,503,368 A | | 3/1985 | Sakamoto |
| 4,508,998 A | * | 4/1985 | Hahn .......................... 318/138 |
| 4,698,538 A | * | 10/1987 | Yoshida ....................... 310/179 |

(List continued on next page.)

FOREIGN PATENT DOCUMENTS

JP 404054853 A * 2/1992

*Primary Examiner*—Nestor Ramirez
*Assistant Examiner*—Julio Gonzalez Ramirez
(74) *Attorney, Agent, or Firm*—Edward Dreyfus

(57) ABSTRACT

The invention refers to magnetoelectric machines. It can be used when manufacturing different-purpose electric drives—for instance, in fans, compressors, electromobile's wheels, and so forth. It comprises a rotor made in the form of two disks, the teeth of which on the outer or inner circumference make up rotor poles and an axially magnetized cylindrical magnet (placed between said disks). The stator (made in the form of coils that are distributed over the circumference and that are installed predominantly in the space between the rotor poles) provides for the possibility of the end face interaction with the rotor poles. The rotor could be made as a multi-sectional unit. In this case said disks have the plate-like shape, owing to which fact the poles of one disk are located between the poles of another disk in one plane, while the magnets of adjacent section are oriented towards one another with like poles. The disks could be made integral with a magnet in such a manner that they serve as magnet's poles. The design is characterized by a high degree of adaptability to streamlined manufacture of the rotor and by rotor durability. Owing to the fact that rotor poles are located in the planes perpendicular to device axis and stator poles are located in such a way that a possibility of the end face interaction with rotor poles is provided for, it becomes possible to reduce the radial size of the device. A plate-like shape of said disks makes it possible to optimize the size of the device depending on the magnet and stator used, required power and the size of a device, in which this electric drive is supposed to be mounted.

6 Claims, 10 Drawing Sheets

U.S. PATENT DOCUMENTS

Figure 1:
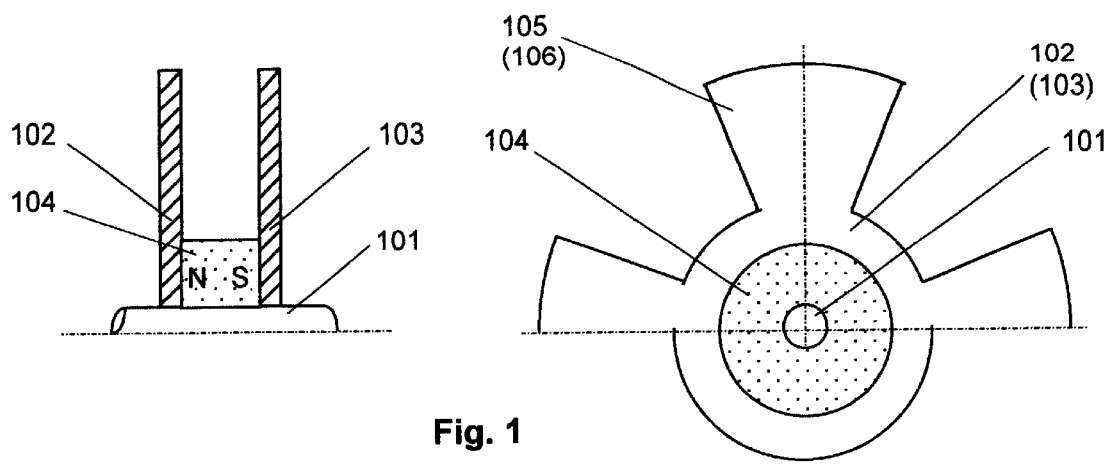

| | | | |
|---|---|---|---|
| 4,733,120 A | | 3/1988 | Kawabe |
| 4,763,050 A | * | 8/1988 | Ruppert ................. 310/156.35 |
| 4,801,830 A | * | 1/1989 | Ogino et al. .............. 310/68 B |
| 4,823,038 A | * | 4/1989 | Mizutani et al. ............ 310/257 |
| 4,876,471 A | * | 10/1989 | Lacour ....................... 310/105 |
| 5,030,864 A | * | 7/1991 | Van Hout et al. ......... 310/67 R |
| 5,111,098 A | * | 5/1992 | Peck et al. ............. 310/156.64 |
| 5,250,865 A | * | 10/1993 | Meeks ....................... 310/90.5 |
| 5,289,066 A | * | 2/1994 | Clark ....................... 310/67 R |
| 5,440,185 A | * | 8/1995 | Allwine, Jr. ................. 310/114 |
| 5,552,653 A | * | 9/1996 | Nose ........................... 310/12 |
| 5,596,238 A | * | 1/1997 | Milnikel .................... 310/103 |
| 5,854,526 A | * | 12/1998 | Sakamoto .................. 310/162 |
| 5,952,758 A | * | 9/1999 | Lucidarme et al. .... 310/156.64 |
| 6,005,320 A | * | 12/1999 | Kim et al. .................. 310/114 |
| 6,232,690 B1 | * | 5/2001 | Schmider .................... 310/112 |
| 2002/0067091 A | * | 4/1999 | Kliman et al. ......... 310/156.01 |

\* cited by examiner

ELECTRIC DRIVE APPARATUS WITH A ROTOR HAVING TWO MAGNETIZIED DISKS

FIELD OF ENGINEERING

The invention covered by this application is related to electric engineering, in particular, to magnetoelectric machines, and may be used in the manufacture of electric drives for various purposes, e.g. ventilation plants, compressors, wheels of electrically driven automobiles etc.

BACKGROUND

Well-known are machines of end-face rotor-stator interaction type, where the rotor is a disk, on the end surfaces whereof permanent magnets of alternating polarity are located over the circumference. The stator of such machines is made in the shape of a disk (ring), installed coaxially with the rotor, electromagnetic stator coils being located at the end faces of the stator. For instance, the direct current brushless electric motor (electric drive) described in U.S. Pat. No. 5,440,185, IPC 6 H02K 21/12 belongs to this type of electric machines. The known device includes at least one rotor installed on the shaft and made as a multi-pole magnetic disk consisting of sections spaced along the circumference, where the polarity of the sections alternates. The device also includes at least one disk-shaped stator element, determining the rotor position, the device for mounting the rotor (rotors) and stator element (elements) on the common axle, the sensor for positioning the multi-pole magnetic disk versus the stator element and a device to identify the magnetic field profile in the stator elements. Two windings are wound over the stator elements, electric current being fed to one of those thus determining the polarity of the stator poles. The known device is not easy in manufacturing, the biggest difficulty being manufacturing of disk-shaped rotors with magnetic poles of alternating polarity.

The closest analogue to the invention being claimed is an electric machine with a rotor having claw-shaped poles (V. A. Balagurov, F. F. Galateyev. Electric Generators with Permanent Magnets.—Moscow: "Energiya", 1988, pp. 31–32). The rotor in a machine of this type is a cylindrical, axially magnetized permanent magnet, to the end surfaces whereof two disks with horns jutting out like "claws" on the poles are fixed. The disks are made of magnetically soft material, all poles of one disk being northern, and of the other one—southern. The pole horns are oriented in parallel to the generatrix of the permanent magnet cylinder while the rotor disks are shifted against each other in such a way that the poles of the one are between the poles of the other.

In order to increase the power of the machine, the rotor is made of multiple sections. At that several sections are mounted on the same shaft, each consisting of two disks with claw-shaped poles and a cylindrical magnet magnetized in the axial direction located between them. When the multi-sectional rotor is being assembled, the magnets in the adjacent sections are oriented towards each other with their like poles.

The known designs of electric machines with claw-shaped rotors have an advantage of being equipped with only one magnet tightly fixed between two disks. This ensures high impact strength of the rotor. At the same time such rotors are rather difficult to manufacture. Besides, at high revolutions under the influence of centrifugal forces the "claws" may bend out. To prevent this the device should be reinforced, which results in its heavier weight. Since it is radial interaction between the rotor and the stator that is actualized in the known design, the machines of this type are of great radial dimensions.

DISCLOSURE OF THE INVENTION

The engineering problem to be solved with the help of the invention in question is the development of an electric drive simple in manufacturing, reliable and compact. Four options of addressing this problem are being claimed.

The essence of the invention in conformity with the first option consists in that in the known electric drive, the rotor whereof is made of two disks mounted on a shaft with poles distributed over the outer circumference and a cylindrical magnet located between the disks and magnetized in the axial direction, in such a manner that the poles of each disk are the like ones, and in regard to the poles of the other disk—the unlike ones, the stator being made of coils distributed over the circumference, while in accordance with the invention the rotor poles are formed by the teeth located over the outer circumference of both disks in planes perpendicular to the axis of the device, and the poles of the stator coils are arranged in such a way as to allow for their end-face interaction with the rotor poles.

Unlike the known design, the rotor of the device being the subject of the application has no claw-shaped pole horns (poles). The rotor poles are formed by the teeth located over the outer circumference of both disks, which function as magnetic circuits. This ensures streamlined manufacturing of the rotor and its structural strength. Owing to the fact that the rotor poles are located over the outer circumference of both disks in planes perpendicular to the axis of the device, and the poles of the stator are arranged in such a way as to allow for their end-face interaction with the rotor poles, there arises an opportunity to make the radial size of the device smaller.

As a particular example, the stator poles may be located in the space between the above-mentioned rotor poles outfitted on both disks. This will make it possible to raise the power of the drive, as the magnetic field in the space between the rotor poles will have the highest intensity.

The rotor disks, one or both of them, may be made as flat disks with teeth—poles over the outer circumference, and in this case the rotor poles will be in the same plane with the respective disk, or they may have a plate-like shape. This permits to obtain the device of the optimum size in dependence of the magnet used, stator, rotor, the required power, and the size of the equipment where the electric drive is supposed to be installed.

In dependence of the stator design the rotor poles of one disk may be located both opposite the rotor poles of the other disk, or between them. Taking in view the fact that the operating principle of such devices is based on alternate switching of the stator coils distributed over the circumference, whose magnetic field interacts with the rotor poles, this latter option of rotor poles arrangement provides for a steadier rotation of the rotor, since it practically increases the total number of the rotor poles by a factor of 2.

In addition, the rotor poles on each disk may have an L-shaped pole horn, with one "leg" oriented in the axial direction, and the other one located between the rotor poles of the other disk in the same plane with those. This will make it possible to focus the magnetic field of the rotor thus increasing the power of the electric drive.

The rotor may be manufactured in such a way that the disks are integrated with the magnet serving as its poles.

This will require a magnet of a sophisticated configuration, however, eliminating losses in magnetic circuit disks, thereby raising the intensity of the magnetic field in the gap between the rotor poles. Another feasible option is to manufacture the magnet of two symmetrical parts joined along the plane perpendicular to the axis of the device. In this case both the manufacturing of the magnet and the assembling process of the device are made easier.

The essence of the invention in conformity with the second option consists in that in the known electric drive, the rotor whereof is made of one or a number of sections, each consisting of two disks mounted on a shaft with poles distributed over the outer circumference and a cylindrical magnet located between the disks and magnetized in the axial direction, in such a manner that the poles of each disk are the like ones, and in regard to the poles of the other disk—the unlike ones, the rotor poles of one disk located between the rotor poles of the other disk, and the stator being made of coils distributed over the circumference, while in accordance with the invention in each section of the rotor one or both disks are plate-shaped, and the rotor poles are formed by teeth located over the outer circumference of both disks in the same plane perpendicular to the axis of the device, the poles of the stator coils being arranged in such a way as to allow for their end-face interaction with the rotor poles.

Just like it is with the first option, unlike the known design, the rotor of the device being the subject of the application has no claw-shaped pole horns (poles). The rotor poles are formed by teeth located over the outer circumference of both disks. This ensures streamlined manufacturing of the rotor and its structural strength. Owing to the fact that the rotor poles are located over the outer circumference of both disks in planes perpendicular to the axis of the device, which is attained through the plate-like configuration of the disks, and the poles of the stator are arranged in such a way as to allow for their end-face interaction with the rotor poles, there arises an opportunity to make the radial size of the device smaller.

In the case of a multi-sectional rotor the adjacent disks are joined together in the way of the cylindrical magnets, and the cylindrical magnets of the adjacent sections are oriented towards each other with their like poles. Making the drive multi-sectional allows for its power to be increased.

Just like with the first option, in dependence of the stator design the poles of adjacent disks of a multi-sectional rotor may be positioned both opposite each other, or in the gaps between each other. The latter arrangement provides for a steadier rotation of the rotor.

In addition, in the case when the poles of adjacent disks of a multi-sectional rotor are positioned in the gaps between each other, these adjacent disks may be made as one disk with poles for both adjacent sections.

Like with the first option, it is possible to manufacture the rotor in such a way that the disks are integrated with the magnet serving as its poles, including a design when the magnet is manufactured of two symmetrical parts joined along the plane perpendicular to the axis of the device.

The principal difference between the first two options and the third and the fourth option is in that under the first and the second options the rotor poles are formed by the teeth located over the outer circumference of the discs, while under the third and the fourth options the rotor poles are formed by the teeth located over the inner circumference of the disks.

The essence of the invention in conformity with the third option consists in that in the known electric drive, the rotor whereof is made of two disks with the poles distributed over the circumference and a cylindrical magnet located between the disks and magnetized in the axial direction, in such a manner that the poles of each disk are the like ones, and in regard to the poles of the other disk—the unlike ones, and the stator being made of coils distributed over the circumference, while in accordance with the invention the rotor poles are formed by teeth arranged over the inner circumference of both disks, oriented towards the axis of the device and located in the planes perpendicular to the axis of the device, while the poles of the stator coils being arranged in such a way as to allow for their end-face interaction with the rotor poles.

Due to the fact that the rotor poles are arranged over the inner circumference of the disks towards the axis of the device, the cylindrical magnet will have the maximum radial dimension for the given radial dimension of the device itself. This permits to significantly increase the power of the electric drive.

Owing to the fact that the rotor poles are located in the planes perpendicular to the axis of the device, and the poles of the stator are arranged in such a way as to allow for their end-face interaction with the rotor poles, there arises an opportunity to make the radial dimension of the device smaller.

As a particular example, the stator poles may be located in the space between the above-mentioned rotor poles outfitted on both disks. This will make it possible to raise the power of the drive as the magnetic field in the space between the rotor poles will have the highest intensity.

The rotor disks, one or both of them, may be made either as flat disks with teeth—poles over the inner circumference, and in this case the rotor poles will be in the same plane with the respective disk, or they may have a plate-like shape. This permits to obtain the device of the optimum size in dependence of the magnet, stator, or rotor used, the required power, and the size of the equipment where the electric drive is supposed to be installed.

In dependence of the stator design the rotor poles of one disk may be positioned both opposite the rotor poles of the other disk, or between them. Taking in view the fact that the operating principle of such devices is based on alternate switching of the stator coils distributed over the circumference, whose magnetic field interacts with the rotor poles, this latter option of rotor poles arrangement provides for a steadier rotation of the rotor, since it practically increases the total number of the rotor poles by a factor of 2.

In addition, the rotor poles on each disk may have an L-shaped pole horn, with one "leg" oriented in the axial direction, and the other one located between the rotor poles of the other disk in the same plane with those. This will make it possible to focus the magnetic field of the rotor thus increasing the power of the electric drive.

The rotor may be manufactured in such a way that the disks are integrated with the magnet serving as its poles. This will require a magnet of a sophisticated configuration, however, eliminating losses in magnetic circuit disks, thereby raising the intensity of the magnetic field in the gap between the rotor poles. Another feasible option is to manufacture the magnet of two symmetrical parts joined along the plane perpendicular to the axis of the device. In this case both the manufacturing of the magnet and the assembling process of the device are made easier.

The essence of the invention in conformity with the fourth option consists in that in the known electric drive, the rotor whereof is made of one or a number of sections, each consisting of two disks with poles distributed over the circumference and a cylindrical magnet located between the disks and magnetized in the axial direction, in such a manner that the poles of each disk are the like ones, and in regard to the poles of the other disk—the unlike ones, the rotor poles of one disk located between the rotor poles of the other disk, and the stator being made of coils distributed over the circumference, while in accordance with the invention in each section of the rotor one or both disks are plate-shaped, and the rotor poles are formed by teeth arranged over the inner circumference of both disks, oriented towards the axis of the device and located in the same plane perpendicular to the axis of the device, the poles of the stator coils being arranged in such a way as to allow for their end-face interaction with the rotor poles.

Just like it is with the third option, unlike the known design, the rotor of the device being the subject of the application has no claw-shaped pole horns (poles). The rotor poles are formed by teeth located over the inner circumference of both disks. This ensures a properly streamlined manufacturing of the rotor and its structural strength.

Owing to the fact that the rotor poles are positioned in the same plane perpendicular to the axis of the device, which is attained through the plate-like configuration of the disks, and the poles of the stator are arranged in such a way as to allow for their end-face interaction with the rotor poles, there arises an opportunity to make the radial size of the device smaller.

Like it is with the third option, due to the fact that the rotor poles are arranged over the inner circumference of the disks towards the axis of the device, the cylindrical magnet will have the maximum radial dimension for the given radial dimension of the device itself. This permits to significantly increase the power of the electric drive.

In the case of a multi-sectional rotor the adjacent disks are joined together in the way of the cylindrical magnets, and the cylindrical magnets of the adjacent sections are oriented towards each other with their like poles. Making the drive multi-sectional allows for its power to be increased.

Just like with the third option, in dependence of the stator design the poles of adjacent disks of a multi-sectional rotor may be positioned both opposite each other, or in the gaps between each other. The latter arrangement provides for a steadier rotation of the rotor.

In addition, in the case when the poles of adjacent disks of a multi-sectional rotor are located in the gaps between each other, these adjacent disks may be made as one disk with poles for both adjacent sections.

Like with the third option, it is possible to manufacture the rotor in such a way that the disks are integrated with the magnet serving as its poles, including a design when the magnet is manufactured of two symmetrical parts joined along the plane perpendicular to the axis of the device.

A BRIEF DESCRIPTION OF THE DRAWING FIGURES

Figure 2:
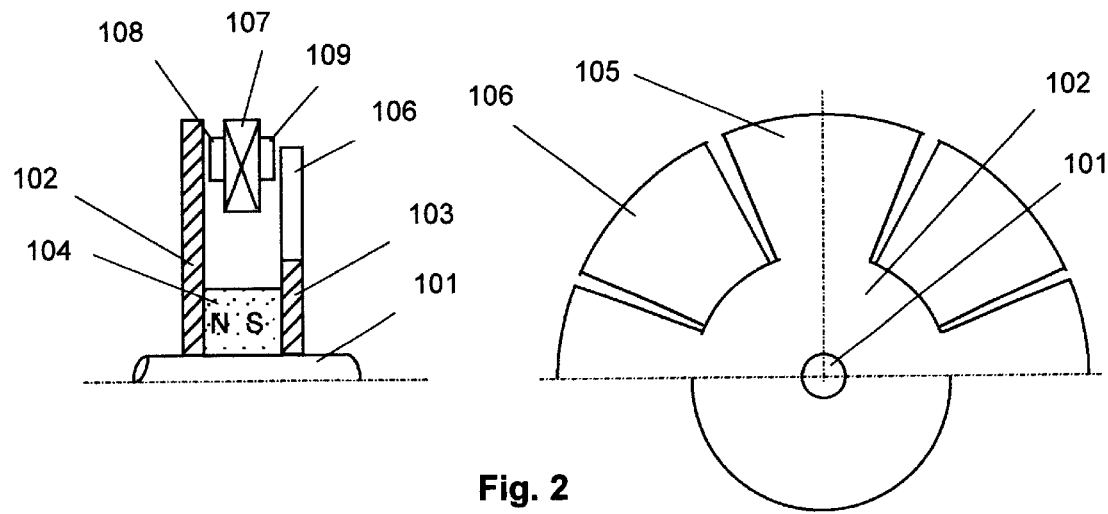
Figures 3, 4, 5:
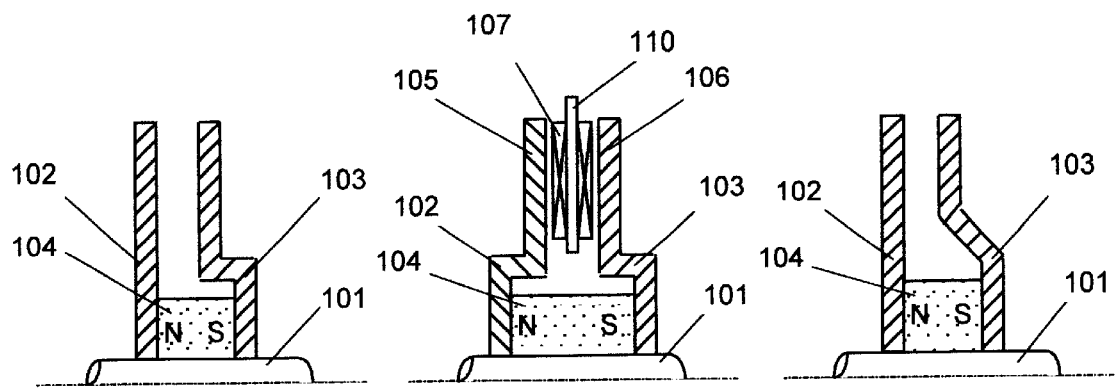
Figure 6:
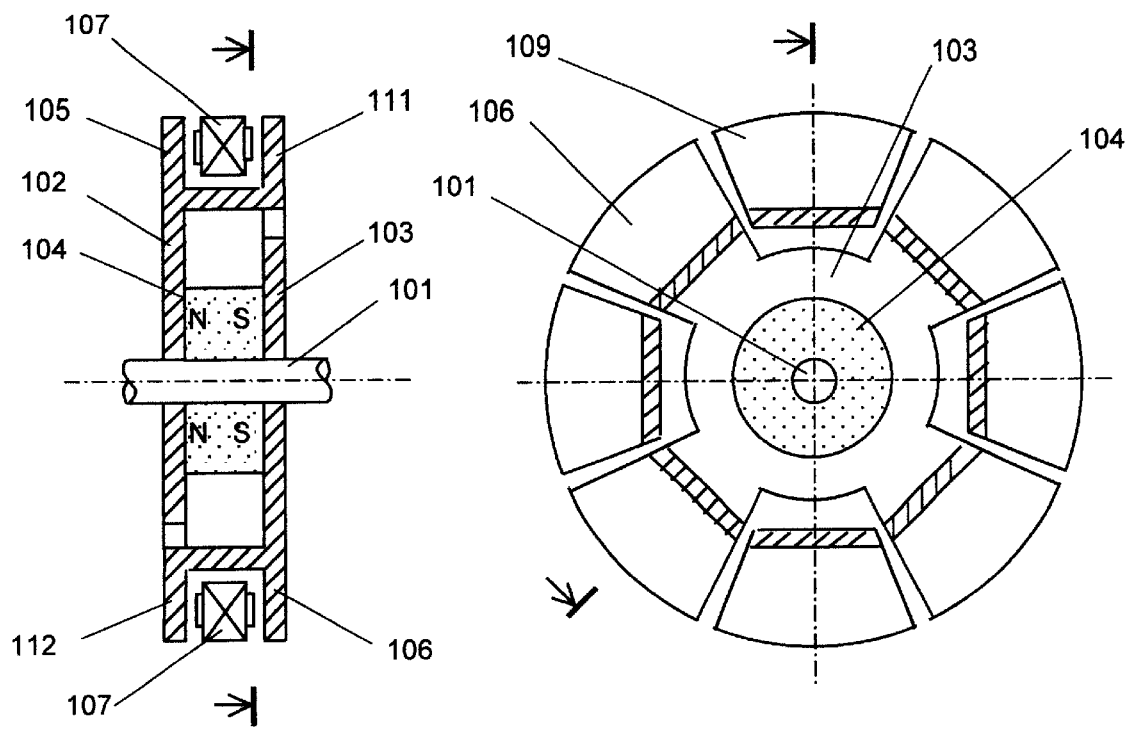
Figure 7:
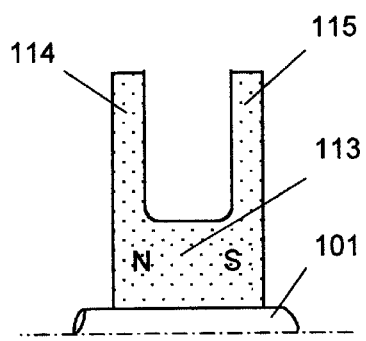
Figure 8:
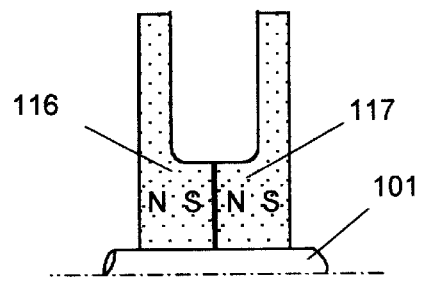
Figure 9:
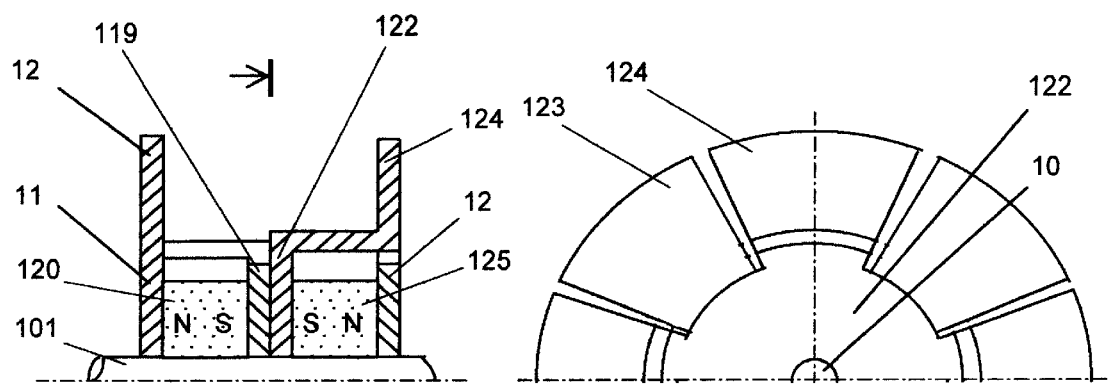
Figure 10:
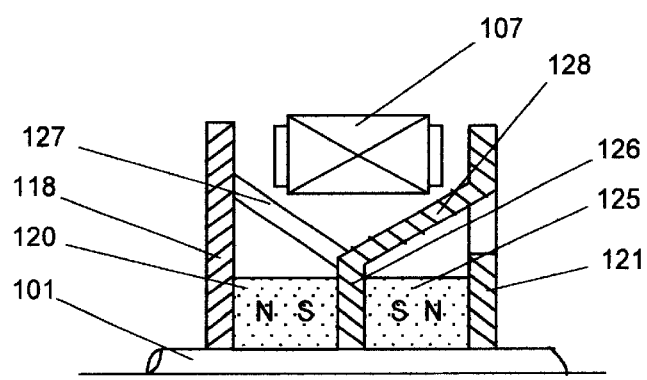
Figure 11:
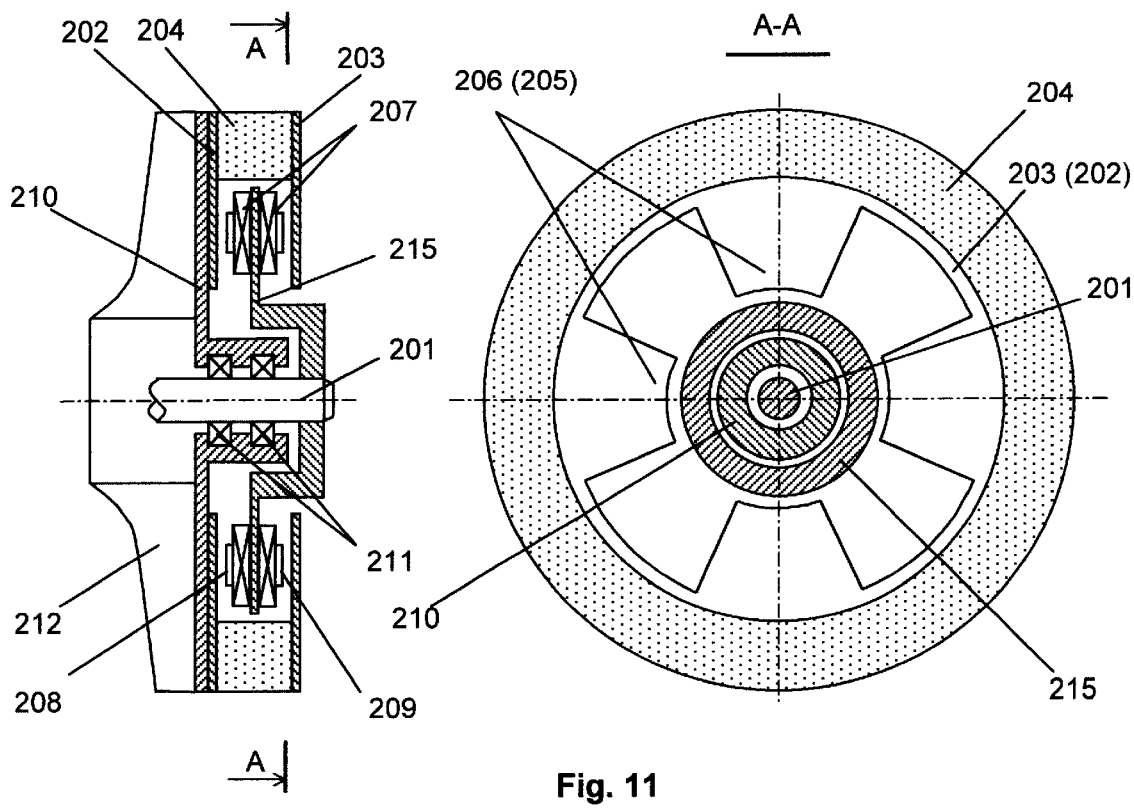
Figure 12:
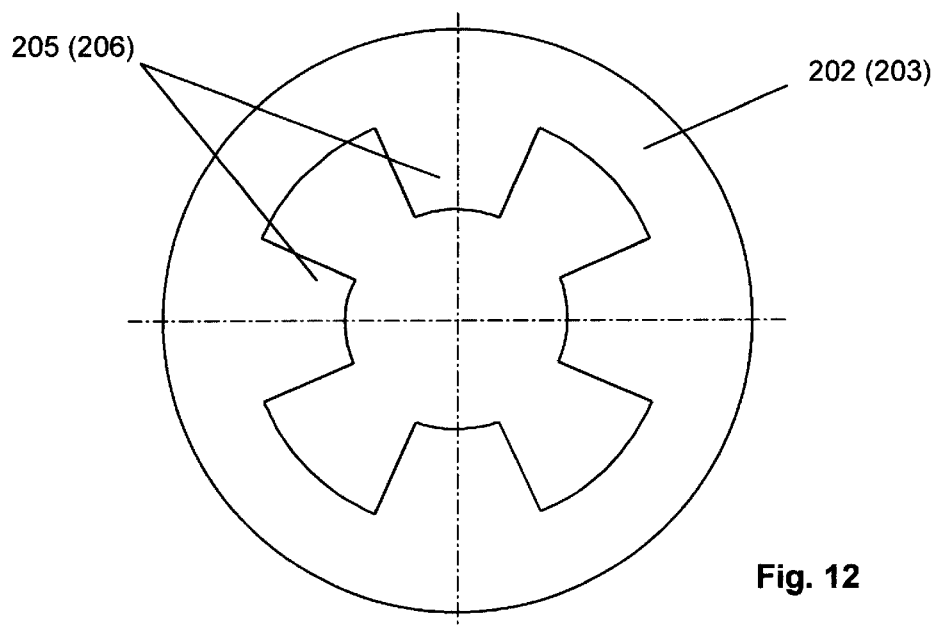
Figure 13:
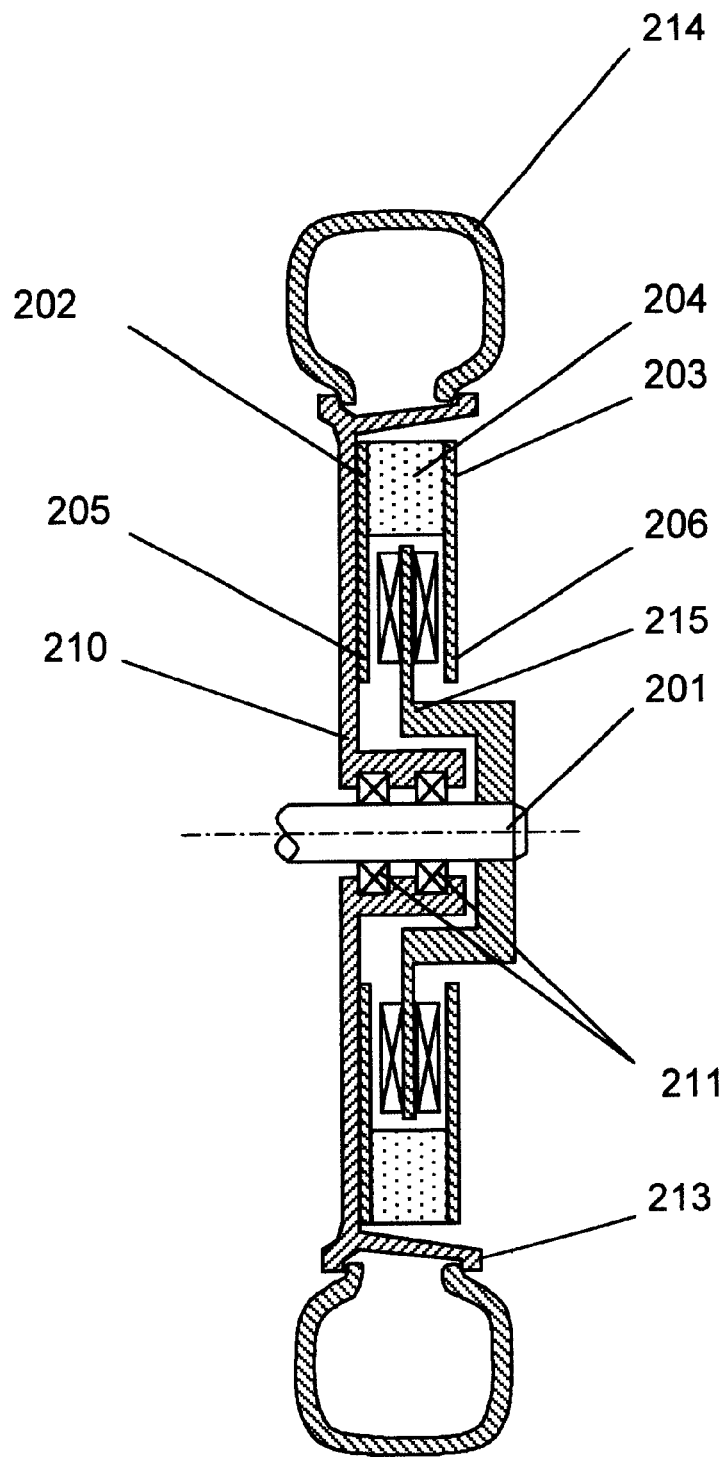
Figures 14, 15:
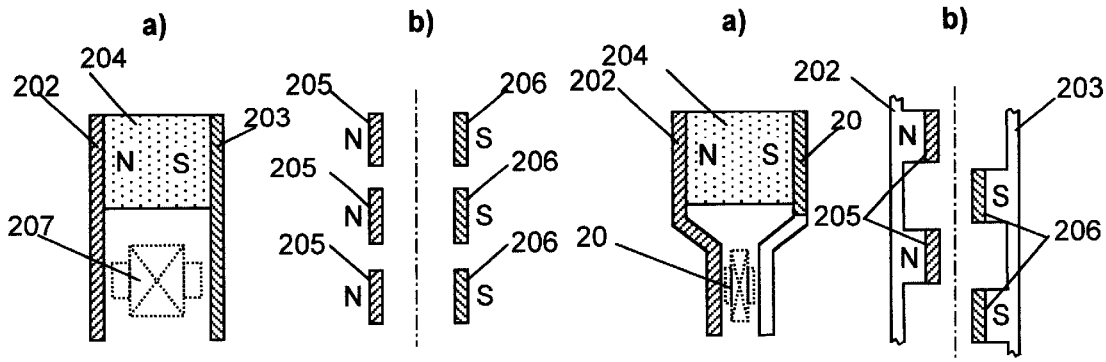
Figures 16, 17:
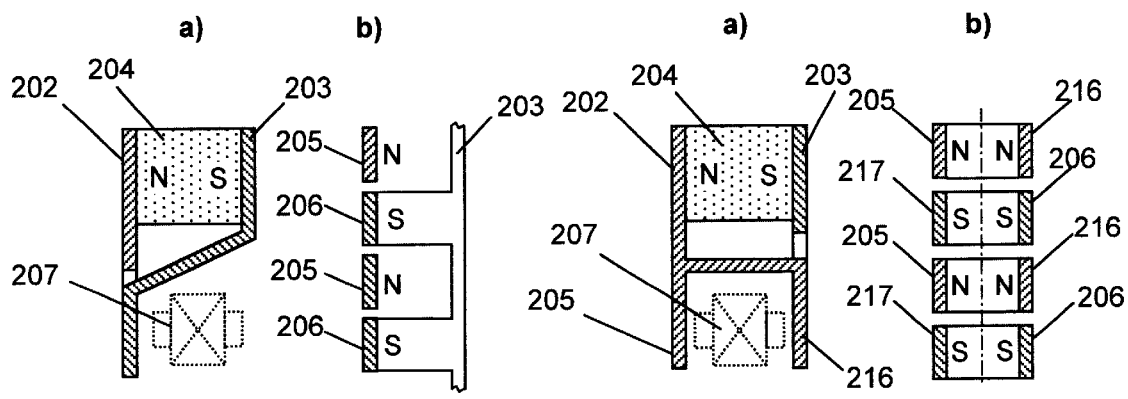
Figures 18, 19:
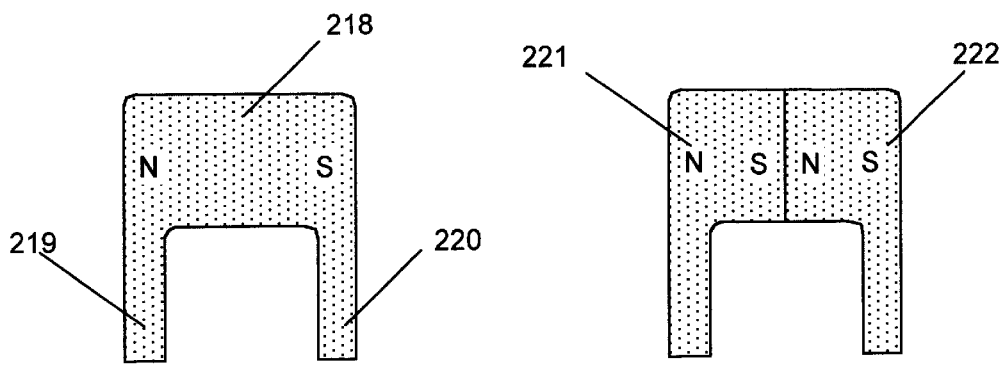
Figure 20:
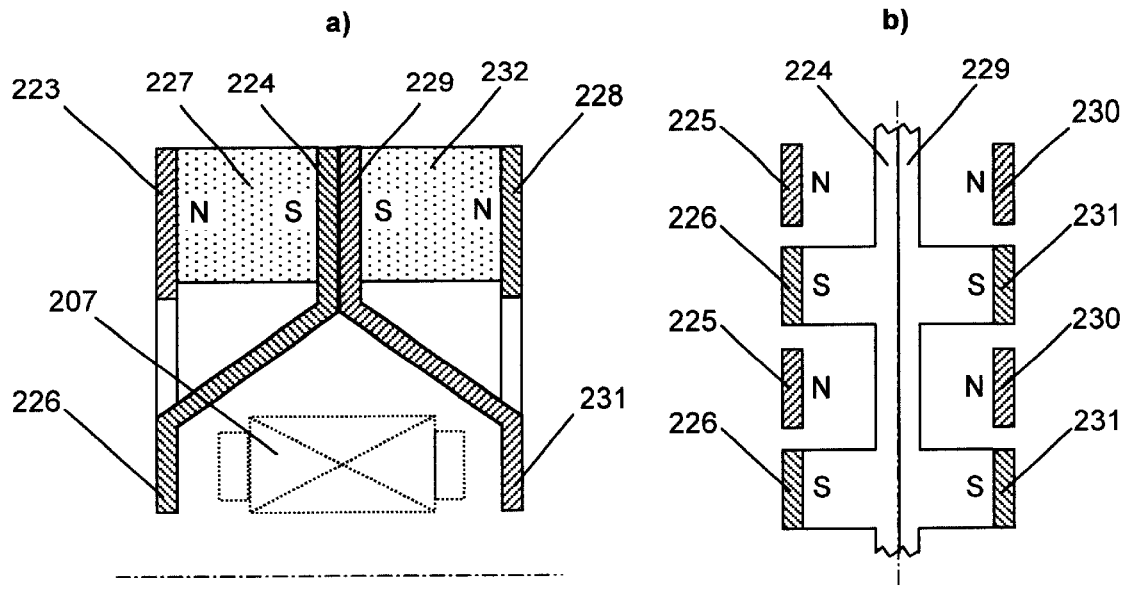
Figure 21:
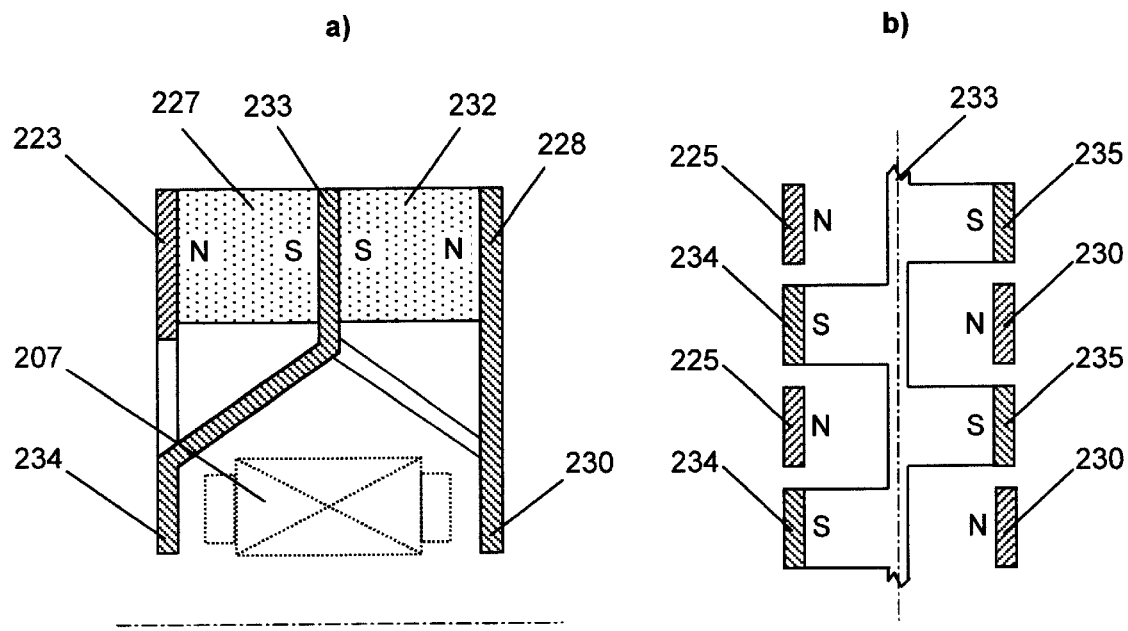
Figure 22:
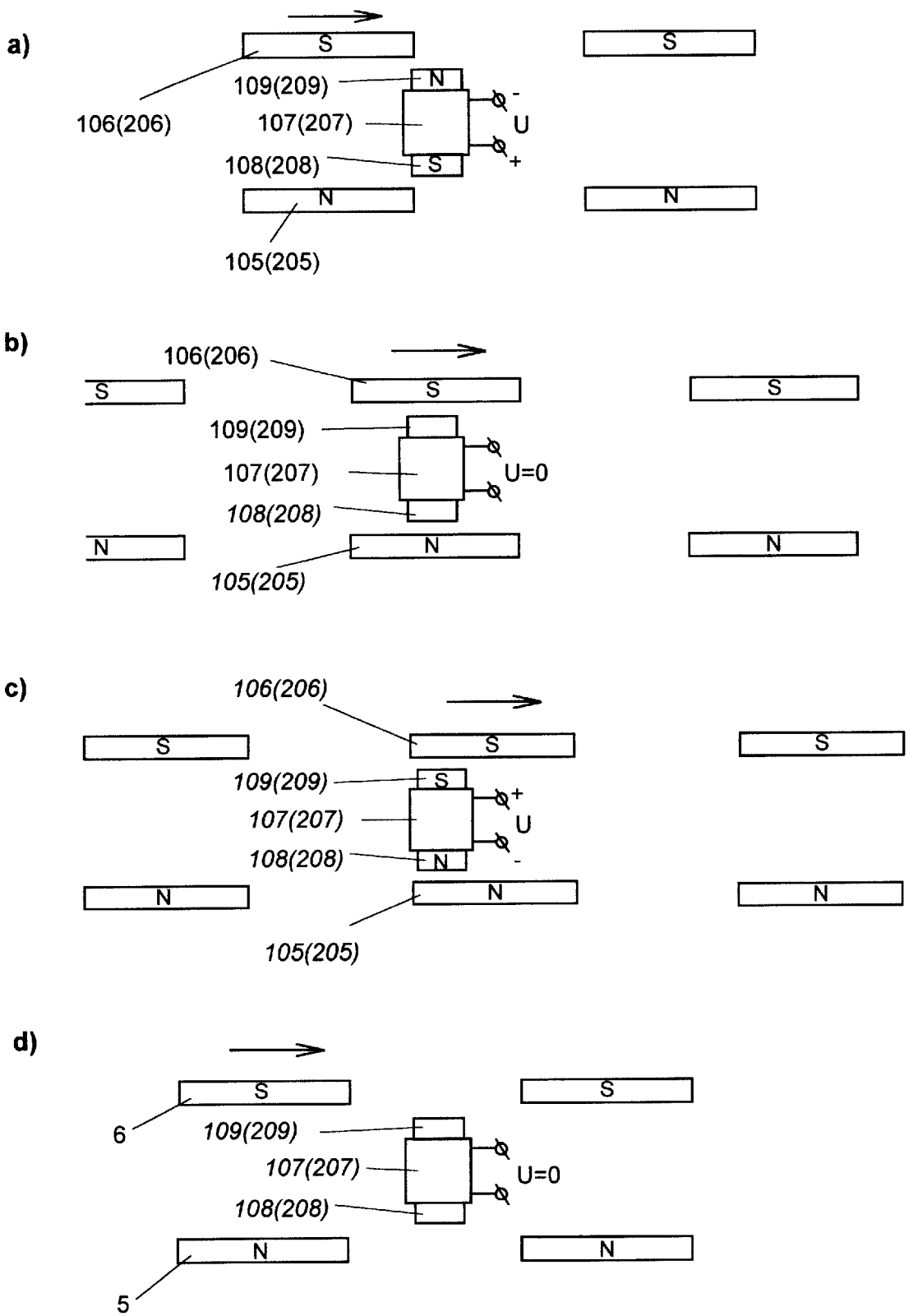
Figure 23:
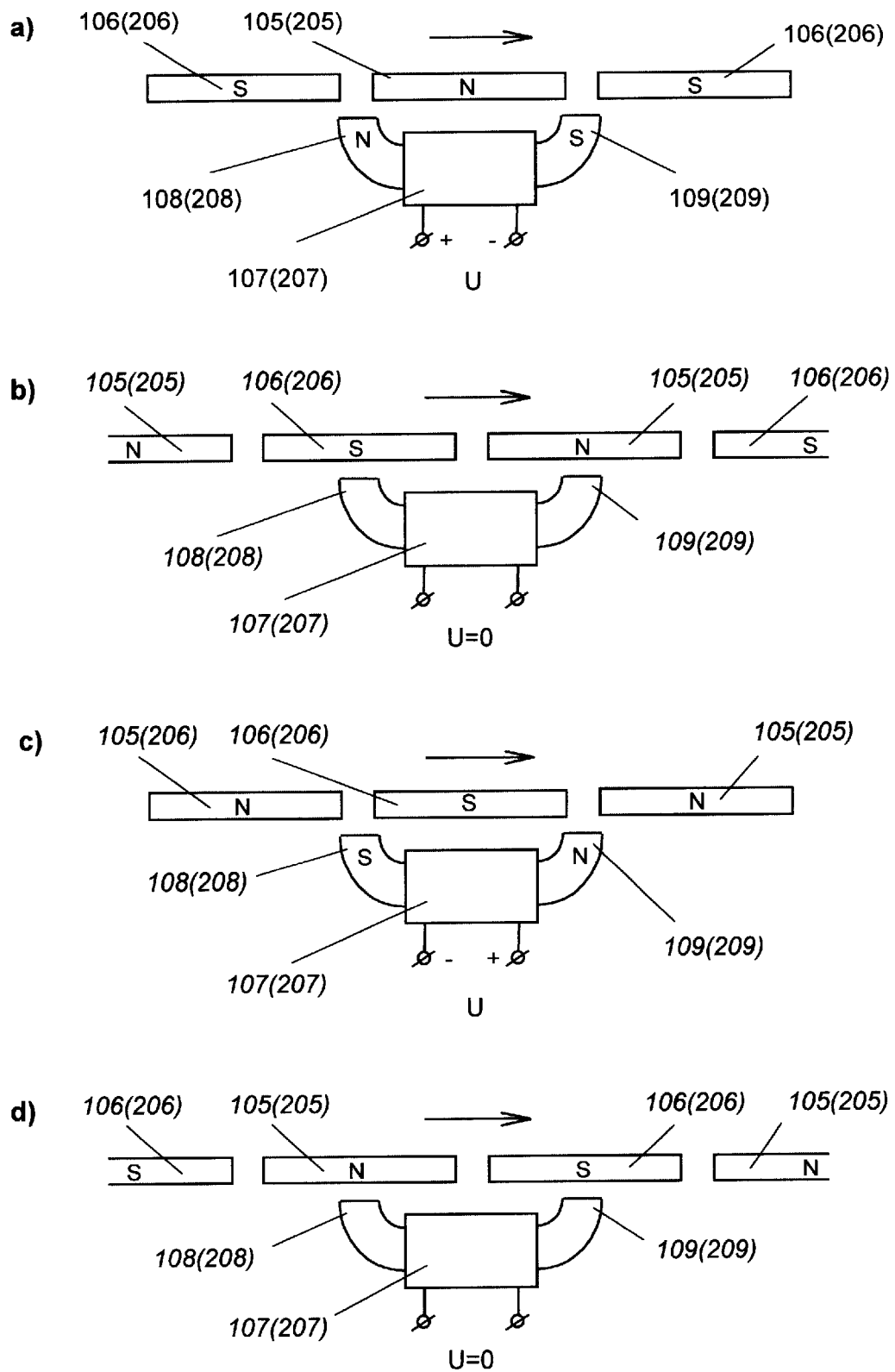
Figure 24:
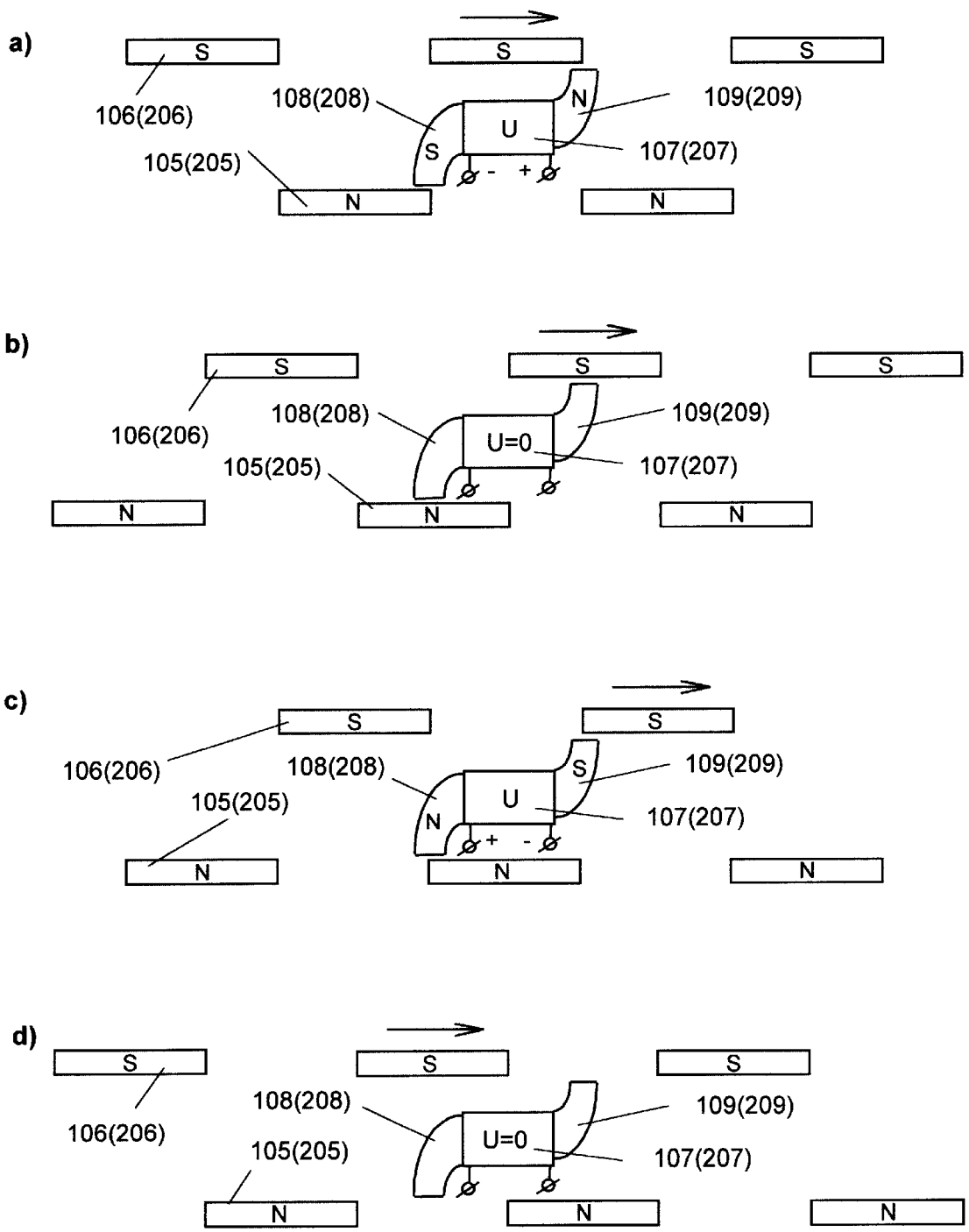

The essence of the invention (options) being claimed is explained with the graphic materials:

FIG. 1—the rotor of the electric drive in conformity with the first option, where the poles of one disk are positioned opposite the poles of the other disk;

FIG. 2—the rotor of the electric drive in accordance with the first option, where the poles of one disk are positioned between the poles of the other disk;

FIG. 3, FIG. 4 and FIG. 5—samples of plate-like disks of the rotor of the electric,drive in accordance with the first option;

FIG. 6—the rotor of the electric drive in accordance with the first option with additional L-shaped pole horns;

FIG. 7—the rotor of the electric drive in accordance with the first option, where disks are integrated with the magnet;

FIG. 8—the rotor of the electric drive in accordance with the first option, where disks are integrated with the magnet and consist of two symmetrical parts joined together in the plane perpendicular to the axis of the device;

FIG. 9—a sample two-section rotor of the electric drive in accordance with the second option;

FIG. 10—a sample two-section rotor of the electric drive in accordance with the second option, for the case when the adjacent disks are made as a single disk with poles for both adjacent sections;

FIG. 11—the electric drive in accordance with the third option connected to a centrifugal ventilator, as an example of possible use;

FIG. 12—a sample design of the rotor disk;

FIG. 13—the electric drive in accordance with the third option connected to the rim of a vehicle wheel, as an example of possible use;

FIG. 14—a sample rotor of the electric drive in accordance with the third option, where the poles of one disk are positioned opposite the poles of the other disk;

FIG. 15—a sample rotor of the electric drive in accordance with the third option, with plate-like disks, the poles of different disks being positioned in different planes, and the stator poles to be located between them;

FIG. 16—a sample rotor of the electric drive in accordance with the third option, with one of the disks being of plate-like configuration, and the poles of both disks in the same plane;

FIG. 17—a sample rotor of the electric drive in accordance with the third option, with additional L-shaped pole horns;

FIG. 18—the rotor of the electric drive in accordance with the third option, where the disks are integrated with the magnet;

FIG. 19—a sample rotor of the electric drive in accordance with the third option, where the disks are integrated with the magnet and consist of two symmetrical parts joined together in the plane perpendicular to the axis of the device;

FIG. 20—a sample two-section rotor of the electric drive in accordance with the fourth option;

FIG. 21—a sample two-section rotor of the electric drive in accordance with the second option, for the case when the adjacent disks are made as a single disk with poles for both adjacent sections;

FIG. 22, FIG. 23 and FIG. 24—samples of locating the stator poles versus the rotor poles, explaining the operation of all optional electric drive designs.

OPTIONS FOR THE IMPLEMENTATION OF THE INVENTION

The rotor of the invention being claimed in accordance with the first option (FIG. 1–FIG. 6) comprises disks 102 and 103 mounted on the shaft 101, as well as the axially magnetized cylindrical magnet 104 located between disks 102 and 103 performing the function magnetic circuits Over their outer circumference the disks 102 and 103 have poles 105 and 106 respectively, made in the shape of teeth. The shaft 101 is manufactured of a non-magnetic material, brass for instance. The shaft 101 may also be manufactured of non-magnetic materials, steel for instance, but in such case, to reduce magnetic losses, it would be expedient to fit it with a washer of non-magnetic material (not shown in FIG. 1–FIG. 10) to separate the shaft 101 from the disks 102, 103 and the magnet 104. The disks 102 and 103 may be mounted in such a manner that the poles 105 N 106 will be located opposite each other, that is their axial projections on a plane normal to the shaft axis are aligned, (see FIG. 1), or may be turned so that in the axial direction the poles 105 will be located between the poles 106 and vice versa (see FIG. 2). The stator coils 107 may be installed on either side in regard to the poles 105 and 106 so that end-face interaction between them were provided. The most preferable arrangement is to install the stator coils 107 in the gap between the poles 105 and 106 (see FIG. 2), with pole tips 108 and 109 of the stator coils 107 located opposite the rotor poles 105 and 106 respectively.

One or both of the disks 102 and 103 may be of plate-like shape, as shown in FIG. 3–FIG. 5. Such configuration helps to optimize the gap between the poles 105 and 106 in dependence of the axial dimension of the magnet 104 and the shape and size of the stator coils 107. Specifically, in FIG. 4 a sample embodiment of the design is shown for the case when in order to develop a strong coercitive force the magnet 104 has an extensive axial dimension, and the stator coils 107 are made flat, for instance, like printed conductors on the circuit board 110. In such case to ensure the proper gap between the rotor poles 105, 106 and stator coils 107 the disks 102 and 103 are made in plate-like shape. The plate-shaped disks 102 and 103 may be manufactured by forming.

Another sample embodiment of the device being claimed is shown in FIG. 6. The electric drive consists of disks 102 and 103 mounted on the shaft 101, as well as the axially magnetized cylindrical magnet 104 located between them. Along their outer circumference disks 102 and 103 have poles 105 and 106 respectively, made in the shape of teeth. In addition poles 105 N 106 have L-shaped pole horns 111 and 112, whose one "leg" is oriented in the axial direction, and the other one is located between poles 106 and 105 respectively in the same plane with the latter. Stator coils 107 are located in the space formed by poles 105 and pole horns 111, and by poles 106 and pole horns 112. This arrangement makes it possible to increase the power of the electric drive.

In FIG. 7 a sample arrangement of disks 102 and 103 integrated with the magnet 104 is shown. In this case an axially magnetized annular magnet is formed to have a cylindrical part 113 and pole parts 114, 115. Here pole parts 114 and 115 have teeth performing the function of the rotor poles. In order for the stator to be installed with its coils located in the gap between the poles of such rotor, the stator should be made dismountable. Since it might not be always convenient, the above-mentioned annular magnet may be manufactured as two axially magnetized magnets 116 and 117 (see FIG. 8), to be assembled on the shaft 101 with their unlike poles towards each other. The latter variant is of greater convenience as it requires simpler molds for manufacturing the magnets 116 and 117.

In FIG. 9 the two-section rotor of the invention being claimed in accordance with the second option is shown. The first section of this rotor comprises disks 118 and 119 mounted on the shaft 101, with the respective poles 123 and 124, made in the shape of teeth, as well as the axially magnetized cylindrical magnet 120 located between the disks 118 and 119 performing the function of magnetic circuits. The second section of the rotor is made in the similar fashion and comprises disks 121 and 122 mounted on the shaft 101, with the respective poles 123 and 124, made in the shape of teeth as well as the axially magnetized cylindrical magnet 125 located between disks 121 and 122. Disk 119 of the first section and disk 122 of the second section are made in a plate-like shape in such a manner that their poles are located between the poles of disks 118 and 121 respectively in the same planes with those latter. For the unification of the rotor parts all disks 118, 119, 121 and 122 may be made in the plate-like shape, of unified dimensions, the poles of the respective disks to be located in the central section planes of both sections. When mounted on the shaft 101 both sections of the rotor are tightly fixed to each other, with magnets 120 and 125 being oriented with their like poles towards each other. To prevent the axial displacement of the sections due to the forces of repulsion developing when magnets 120 and 125 are thus installed, locking devices are provided in the design (not shown in FIG. 9). The preferred location of the stator coils is in the gap between the poles of the disks 118, 119 and 121, 122.

Similar to what is shown in FIG. 7 and FIG. 8, disks 118, 119 and magnet 120, as well as disks 121, 122 and magnet 125 may be manufactured as a single whole, or by integrating two similar parts.

In FIG. 10 a sample embodiment of the device being claimed in accordance with the second option is shown, with a two-section rotor comprising disk 118 and magnet 120 of the first section, as well as disk 121 and magnet 125 of the first section, and disk 126 common to both sections. Teeth 127 and 128 of disk 126 are alternately bent towards the first and the second sections forming the rotor poles together with the teeth of disks 118 and 121. Stator coils 107 are installed in the gap between the latter.

The rotor of the invention being claimed in accordance with the third option (see FIG. 11–FIG. 17) comprises disks 202 and 203 mounted on shaft 201, as well as the axially magnetized cylindrical magnet 204 located between disks 202 and 203 performing the function of magnetic circuits. Over their inner circumference disks 202 and 203 have poles 205 and 206 respectively, made in the shape of teeth oriented towards the axis of the device.

Disks 202 and 203 may be mounted in such a manner that poles 205 and 206 would be positioned opposite each other (see FIG. 11, FIG. 13, FIG. 14), or may be turned so that poles 205 will be located between poles 206 and vice versa (see FIG. 15). Here and hereafter in FIG. 14–FIG. 17, and in FIG. 20 and FIG. 21, Detail a) the axial section of the rotor is shown, while in Detail b) the developed view of the rotor from the axis of the device is shown.

Stator coils 207 may be installed on either side in regard to poles 205 and 206 in such a manner that their end-face interaction were ensured. The most preferred is the variant when stator coils 207 are installed in the gap between poles 205 N 206 (see FIG. 11, FIG. 13–FIG. 15 ), with pole tips 208 and 209 of the stator coils 207 (see FIG. 11) positioned opposite rotor poles 205 and 206 respectively.

Rotor disks 202 and 203 and cylindrical magnet 204 located between them (see FIG. 11, FIG. 13) are held together, for instance, by holder 210, made in the shape of a disk of non-magnetic materials and mounted on the axle 201 by means of bearings 211. At the same time holder 210 may perform the function of a connecting element whereto the driven mechanism can be attached.

Specifically, in FIG. 11 a sample connection of the electric drive being claimed with a centrifugal ventilator is shown, holder 210 serving at the same time as the rear disk of the ventilator, with fan blades 212 attached to it.

Another example of the use of the claimed electric drive is presented in FIG. 13. It can be seen from this FIG. that holder 210 concurrently serves as a wheel rim of a transportation vehicle. Therefore, it has appropriate rim flanges 213 that hold wheel tire 214.

Stator coils 207 (see FIG. 11 and FIG. 13) are held for example, by means of holder 215 made as a disk mounted rigidly on shaft 201.

One disk (either disk 202 or disk 203) or both disks 202 and 203 can be of plate-like shape as shown in FIG. 15 and FIG. 16. Such a shape makes it possible to optimize the gap between pole 205 and pole 206—depending on the axial size of magnet 204 as well as on shape and size of stator coils 207.

Specifically, FIG. 15 presents an example of the embodiment of the claimed electric drive for the case when magnet 204 is of great axial size (needed for the purpose of providing great coercive force), while stator coils 207 are made flat (disk coils)—for instance, as conductor strips on a board. In this case, to set a required gap between rotor poles 205 and 206 and stator coils 207, disk 202 and disk 203 are made of plate-like shape. Disks of plate-like shape (disk 202 and disk 203) could be manufactured, for instance, by the forming method.

FIG. 16 presents an example of the embodiment of the claimed electric drive for the case when one of the disks (disk 203) is of plate-like shape, while at the same time poles 206 of this very disk (disk 203) are placed between poles 205 of disk 202—in one plane with poles 205. In this case stator coils 207 can be placed in the space formed by concave part of disk 203 thus minimizing the axial overall size of a device.

Another example of the embodiment of a rotor for the device claimed (option 3) is presented in FIG. 17. Electric drive's rotor comprises disk 202, disk 203, and axially magnetized cylindrical magnet 204 placed between two said disks. Poles 205 and 206 are made on the inner circumference of disks 202 and 203, respectively. These poles are made in the form of teeth. In addition, poles 205 and 206 have L-shaped pole horns 216 and 217, one "leg" of which is oriented in the axial direction, while the other "leg" is located between poles 206 and 205, respectively (in one plane with the latter). Stator coils 207 are placed in the space formed by poles 205 and pole horns 216, and in the space formed by poles 206 and pole horns 217. Such a design makes it possible to raise the power of electric drive.

FIG. 18 illustrates an example of making disks 202 and 203 integral with magnet 204. In this case an axially magnetized annular magnet having a cylindrical part 218 and pole parts 219 and 220 is produced. In addition, the inner circumferences of pole parts 219 and 220 are shaped as tooth-like, and these teeth perform the function of rotor poles. To ensure the mounting of stator (by placing its coils 207 in the gap of such a rotor), the stator should be dismountable. Since it is not always convenient, said annular magnet can be made out of two axially magnetized magnets 221 and 222 (see FIG. 19) assembled in such a way that their unlike poles are located towards one another. Another convenience of this variant consists in the fact that simpler molds will be required to manufacture magnets 221 and 222.

A two-section rotor for the electric drive (option 4) claimed herein is presented in FIG. 20. The first section of this rotor comprises disks 223 and 224 with respective poles 225 and 226 (the latter are made in the form of teeth) and axially magnetized cylindrical magnet 227 placed between said disks 223 and 224 that perform the function of magnetic conductors. The second rotor section is made in a similar manner. It comprises disks 228 and 229 with respective poles 230 and 231 (the latter are made in the form of teeth) and axially magnetized cylindrical magnet 232 placed between said disks 228 and 229 that perform the function of magnetic conductors. Disk 224 of the first section and disk 229 of the second section are made of plate-like shape in such a way that their poles (pole 226 and pole 231) are placed between poles 225 of disk 223 and poles 230 of disk 228, respectively, in one and the same plane with the latter. To unify and standardize rotor parts, disks 223, 224, 228, and 229 can be made of plate-like shape and of equal size—in this case poles of appropriate disks will be located in the planes of the central cross section of both sections. In the course of assembling process, both rotor sections should be tightly joined together, while magnets 227 and 232 should be positioned so as to face each other with the like poles. To avoid axial displacement of sections (which may happen due to the repulsive force resulting from the above-described installation of magnets 227 and 232), special locking devices are provided in the design (they are not shown in FIG. 20). Placement of stator coils 207 in the gap between the poles of disks 223, 224 and 228, 229 is the most preferable embodiment of this option of the electric drive being claimed.

It is possible to make disks 223 and 224 integral with magnet 227 (as well as to make disks 228 and 229 integral with magnet 232), including an option when they consist of two identical parts—similar to what is shown in FIG. 18 and FIG. 19 for the third option of the electric drive being claimed.

An example of the electric drive design (option 4) with a two-section rotor is presented in FIG. 21. This two-section rotor comprises disk 223 and magnet 227 of the first rotor section, disk 228 and magnet 232 of the second rotor section, and disk 233 that is adjacent to both sections. Teeth 234 and 235 of disk 233 are bent alternately in the direction of the first and second rotor sections, thus (together with teeth 225 of disk 233 and teeth 223 of disk 228) forming rotor poles. Stator coils 207 are installed in the gap formed by said rotor poles.

The operation of the devices claimed herein is based on electromagnetic interaction of alternately turned-on and turned-off stator coils with rotor poles and is similar to the operation of the known electric drives described above. Examples illustrating operation of all claimed options of devices are presented in FIG. 22, FIG. 23, and FIG. 24, which show rotor poles 105(205) and 106(206), stator's electric coil 107(207), and pole tips 108(208) and 109(209) of electric coil core. The arrow in the above-mentioned Figures shows the direction of rotor spinning.

FIG. 22 illustrates a design option when unlike rotor poles 105(205) and 106(206) are located in different planes and oriented right opposite one another. In this case the stator (made up by coils 107(207) distributed over the circumference) is placed in the gap between poles 105(205) and 106(206), while stator pole tips 108(208) and 109(209) are located opposite one another and are facing stator poles 105(205) and 106(206), respectively, thus providing for the end face interaction with the latter. Alternate input of voltage U to stator coil 107(207), including changeover from one polarity to another, results in the production of unlike magnetic poles on pole tips 108(208) and 109(209). Magnetic field created between pole tips 108(208) and 109(209) of stator coil 107(207) interacts with the constant magnetic field that exists between rotor teeth 105(205) and 106(206).

The sequence of switchover of stator coil 107(207) depending on the position of rotor poles 105(205) and 106(206) is shown in FIG. 22. In the position shown in FIG. 22-a, pole tips 108(208) and 109(209) of stator coil 107(207) attract rotor poles 105(205) and 106(206), the magnetization of which is of the opposite sign, which fact results in rotor spinning. When the rotor turns into a position in which the middle part of its poles 105(205) and 106(206) takes the position right opposite pole tips 108(208) and 109(209) of stator coils 107(207)—see FIG. 22-b,—the feeding of supply voltage U is discontinued. The rotor continues spinning due to rotary inertia and displaces into a position shown in FIG. 22-c. At this point voltage U of the opposite polarity is fed to stator coil 107(207), and pole tips 108(208) and 109(209) of stator coil 107(207) begin repelling the like magnetic poles 105(205) and 106(206) of rotor thus spinning it in the specified direction. With further displacement of rotor into a position in which pole tips 108(208) and 109(209) of stator coil 107(207) are placed in the middle of the space between rotor poles 105(205) and 106(206)—see FIG. 22-d, —feeding voltage U is discontinued to be supplied to stator coil 107(207). Then, after the rotor has been displaced in the direction of spinning (due to inertia), the process is repeated.

When the unlike rotor poles 105(205) and 106(206) are placed in one plane (FIG. 23), pole tips 108(208) and 109(209) of stator coil 107(207) get located on one side of said plane. In this case the angular distance between pole tip 108(208) and pole tip 109(209) is equal to the angular distance between adjacent rotor poles 105(205) and 106(206). Alternate feeding of voltage U to stator coil 107(207) results in the production of unlike (opposite) magnetic fields on pole tips 108(208) and 109(209). Said unlike magnetic fields interact with the constant magnetic field between rotor pole 105(205) and rotor pole 106(206).

In the position depicted in FIG. 23-a, pole tips 108(208) and 109(209) of stator coil 107(207) repel the like rotor magnetic poles 105(205) and 106(206), while attracting the unlike rotor magnetic poles 106(206) and 105(205), thus causing it to spin. When the rotor turns into a position in which the middle part of its poles 105(205) and 106(206) takes the position opposite pole tips 109(209) and 108(208) of stator coil 107(207)—see FIG. 23-b, —the feeding of supply voltage U to stator coil 107(207) is discontinued. The rotor continues spinning due to rotary inertia and displaces into a position shown in FIG. 12-c. Thereafter supply voltage U (of the opposite polarity) is fed to stator coil 107(207). In this process, pole tips 108(208) and 109(209) repel the like rotor magnetic poles 106(206) and 105(205), while attracting the unlike rotor poles 105(205) and 106(206). When the rotor turns into a position in which the middle part of its poles 105(205) and 106(206) takes the position opposite pole tips 108(208) and 109(209) of stator coil 107(207)—see FIG. 23-d, —the feeding of supply voltage U to stator coil 107(207) is discontinued. Then, after the rotor has been displaced in the direction of spinning (due to inertia), the process is repeated.

In the device embodiment in which rotor poles 105(205) and 106(206) are located in different planes (and in terms of the circular direction they are located one between another), the stator can be made in the form of coils placed over the circumference, and said coils have pole tips 108(208) and 109(209) oriented to poles 105(205) and 106(206), respectively. In this case the angular distance between pole tip 108(208) and pole tip 109(209) is chosen to be equal to the angular distance between the adjacent poles—i.e. between pole 105(205) and pole 106(206). FIG. 24 illustrating this example of the embodiment of the invention shows four phases of angular positions of the rotor and stages of feeding the supply voltage U to stator coil 107(207) corresponding to said angular positions. Device operation in this case is similar to device operation shown in FIG. 22.

INDUSTRIAL/COMMERCIAL APPLICABILITY

All options and embodiments of the suggested electric drive design are easy to manufacture because they consist of simple parts that are adaptable to streamlined fabrication. The gain in power of the electric drive is attained due to the increase in the radial size of cylindrical magnet. However, the radial size of electric drive design is not too large.

The plate-like shape of disks makes it possible to optimize device size depending on the magnet and stator used in the device, required power, and the size of a device, in which this electric drive is supposed to be mounted.

The above-indicated properties make it possible to use the suggested electric drive in various branches of industry.

What is claimed is:

1. An electric drive comprising a magnetic rotor and a stator;

said magnetic rotor comprising at least two magnetized disks secured on a shaft, which shaft has a rotation axis, each of said at least two magnetized disks having an outer circumferential array of radially extending like magnetized poles and being mounted perpendicularly to the shaft, said poles of one of said magnetized disks being spaced axially from the poles of the other of said magnetized disks to form a gap, and the magnetized poles of one of said disks being axially aligned with and magnetically opposite to respective magnetized poles of the other of said disks, such that the N flux lines of each pole of one of said disks extends to each respective S pole of the other disk in the shortest axial flux dimension across said gap, and said stator comprising a circumferential array of coils, each coil being wound about an axis parallel to the shaft for generating an axially directed electromagnetic field that interacts with said flux lines, said coils being at least partially positioned within said gap during rotor rotation.

2. An electric drive according to claim 1, wherein said magnetized disks are coupled to the shaft at axial positions, the axial distance between said axial positions being equal to or greater than the axial dimension of said gap.

3. An electric drive according to claim 1, further including a cylindrical magnet, said cylindrical magnet being magnetized in the axial direction and placed coaxially to the shaft between said magnetized disks.

4. An electric drive comprising a magnetic rotor and a stator;

said magnetic rotor comprising at least two magnetized disks secured on a shaft, which shaft has a rotation axis, each of said at least two magnetized disks having an inner circumferential array of radially extending like magnetized poles and being mounted perpendicularly to the shaft, said poles or one of aid magnetized disks being spaced axially from the poles of the other of said magnetized disks to form a gap, and the magnetized poles of one of said disks being axially aligned with and magnetically opposite to respective magnetized poles of the other of said disks, such that the N flux lines of each pole of one of said disks extends to each respective S pole of the other disk in the shortest axial flux dimension across said gap, and said stator comprising a circumferential array of coils, each coil being wound about an axis parallel to the shaft for generating an axially directed electromagnetic field that interacts with said flux lines, said coils being at least partially positioned within said gap during rotor rotation.

5. An electric drive according to claim 4, wherein said magnetized disks are coupled to the shaft at axial positions, the axial distance between said axial positions being equal to or greater than the axial dimension of said gap.

6. An electric drive according to claim 4, further including a cylindrical magnet, said cylindrical magnet being magnetized in the axial direction and placed coaxially to the shaft between said magnetized disks.

* * * * *

UNITED STATES PATENT AND TRADEMARK OFFICE
CERTIFICATE OF CORRECTION

PATENT NO.    : 6,515,390 B1
DATED         : February 4, 2003
INVENTOR(S)   : Lopatinsky et al.

It is certified that error appears in the above-identified patent and that said Letters Patent is hereby corrected as shown below:

<u>Column 12,</u>
Line 59, change "aid" to -- said --

Signed and Sealed this

Twenty-second Day of April, 2003

JAMES E. ROGAN
*Director of the United States Patent and Trademark Office*